(12) United States Patent
Wilson (10) Patent No.: US 8,131,018 B2
(45) Date of Patent: Mar. 6, 2012

(54) OBJECT DETECTION AND RECOGNITION SYSTEM

(75) Inventor: Kitchener Clark Wilson, Santa Barbara, CA (US)

(73) Assignee: TK Holdings Inc., Auburn Hills, MI (US)

( * ) Notice: Subject to any disclaimer, the term of this patent is extended or adjusted under 35 U.S.C. 154(b) by 1032 days.

(21) Appl. No.: 12/068,651

(22) Filed: Feb. 8, 2008

(65) Prior Publication Data

US 2009/0202107 A1    Aug. 13, 2009

(51) Int. Cl.
G06K 9/00 (2006.01)
H04N 7/18 (2006.01)
H04N 5/225 (2006.01)

(52) U.S. Cl. .......................... 382/104; 348/154; 348/169

(58) Field of Classification Search .................. 382/103, 382/104, 107, 236; 340/435, 557, 905, 988, 340/990, 901, 902, 933; 701/28, 36, 45, 701/93, 200, 210, 201; 348/154, 155, 169, 348/208.16, 352
See application file for complete search history.

(56) References Cited

U.S. PATENT DOCUMENTS

| 5,204,536 | A | 4/1993 | Vardi |
| 5,633,944 | A | 5/1997 | Guibert et al. |
| 5,844,505 | A | 12/1998 | Van Ryzin |
| 6,213,401 | B1 | 4/2001 | Brown |
| 6,453,056 | B2 | 9/2002 | Laumeyer et al. |
| 6,671,615 | B1 | 12/2003 | Becker et al. |
| 6,792,147 | B1 * | 9/2004 | Saka et al. ..................... 382/199 |
| 6,823,084 | B2 | 11/2004 | Myers et al. |
| 6,836,724 | B2 * | 12/2004 | Becker et al. ................. 701/200 |
| 6,891,960 | B2 * | 5/2005 | Retterath et al. ............. 382/104 |
| 6,937,747 | B2 | 8/2005 | Culp et al. |
| 7,057,532 | B2 | 6/2006 | Shafir et al. |
| 7,068,844 | B1 | 6/2006 | Javidi et al. |
| 7,202,776 | B2 | 4/2007 | Breed |
| 7,366,325 | B2 * | 4/2008 | Fujimura et al. .............. 382/104 |
| 7,389,171 | B2 * | 6/2008 | Rupp .............................. 701/93 |
| 2001/0037203 | A1 | 11/2001 | Satoh |
| 2003/0016869 | A1 | 1/2003 | Laumeyer et al. |

(Continued)

FOREIGN PATENT DOCUMENTS

JP        2005-173649 A       6/2005

(Continued)

OTHER PUBLICATIONS

Communication (Supplementary EP Search Report) in EP Appln No. 09709107.8 dated Jun. 22, 2011.

*Primary Examiner* — Abolfazl Tabatabai (74) *Attorney, Agent, or Firm* — Foley & Lardner LLP (57) ABSTRACT

An object recognition system is provided including at least one image capturing device configured to capture at least one image, wherein the image includes a plurality of pixels and is represented in an image data set, an object detection device configured to identify a plurality of pixels corresponding to objects from the at least one image, wherein an object includes a plurality of pixels and is represented in an object data set, wherein the object data set includes a set of features corresponding to each pixel in the object, and an image recognition device configured to recognize objects of interest present in an object by image correlation against a set of template images to recognize an object as one of the templates.

25 Claims, 6 Drawing Sheets

U.S. PATENT DOCUMENTS

| | | |
|---|---|---|
| 2003/0044061 A1 | 3/2003 | Prempraneerach et al. |
| 2003/0202683 A1 | 10/2003 | Ma et al. |
| 2004/0086153 A1 | 5/2004 | Tsai et al. |
| 2004/0098191 A1 | 5/2004 | Becker et al. |
| 2005/0100192 A1 | 5/2005 | Fujimura et al. |
| 2005/0169530 A1 | 8/2005 | Nakai et al. |
| 2005/0238229 A1 | 10/2005 | Ishidera |
| 2005/0249378 A1 | 11/2005 | Retterath et al. |
| 2007/0131851 A1 | 6/2007 | Holtz |
| 2007/0154067 A1 | 7/2007 | Laumeyer et al. |

FOREIGN PATENT DOCUMENTS

| | | |
|---|---|---|
| JP | 2006-317193 A | 11/2006 |
| KR | 1998-038507 A | 8/1998 |

* cited by examiner

OBJECT DETECTION AND RECOGNITION SYSTEM

BACKGROUND

The present invention generally relates to the imaging field of object detection and recognition. More specifically, the present invention relates to a system for the recognition of objects of interest among other objects in a captured image.

The detection and recognition of objects of interest among other objects within a captured image is a field that has been the subject of intense research since the emergence of digital imaging technology. A variety of systems has been produced which attempt to accurately and precisely detect objects of interest among other objects. In particular, one application of such systems is in the detection and recognition of road signs.

Initially, the detection and recognition of road signs appears to be a well-bounded problem and the solution would be quite simple. That is, road signs tend to occur in standardized positions in traffic scenes. Further, their shape, color and pictograms are known because of national, regional, and local transportation standards. However, the solution to such a problem with an object detection and recognition system is not as simple as it may initially seem.

Indeed, a variety of difficulties are faced by such an object detection and recognition system. An image captured for the purpose of road sign recognition will be acquired from a moving car and the sign size and orientation will change with distance as it may be skewed and rotated. Additionally, many objects will be present in highly complex captured images such as pedestrians, other vehicles, bushes, buildings, and other signs. Some of these other objects may be very similar in shape, pattern, and color to a road sign. To further complicate matters, in many areas road signs exist in many variants that often vary significantly from the legally established standard for that nation, region, or locale. Lastly, as with all applied computer vision systems, the implemented system must be suitable for real-time implementation requiring the processing of large amounts of information in a shortened time-frame.

One example of an object detection and recognition system utilizes a single camera. The images of a single camera are fed into a machine-learning algorithm such as a neural network. The machine-learning algorithm, which has previously been trained by a database of road images, attempts to classify the captured image and its contents thereby allowing a set of objects of interest to be detected as well as recognized. However, this statistical approach to machine learning requires the acquisition of large image databases that is both time-consuming and expensive. Further, this approach is not entirely effective at remedying the problems discussed above with respect to vibration, color variation, obscuring of images, complexity of captured images, and variation of road signs from established standards.

In addition to the use of machine learning algorithms in a statistical approach, another method for detecting objects of interest and subsequently recognizing them is the use of color to aid object segmentation from the background imagery. However, the fast and robust color segmentation of objects is difficult as the color wavelength arriving at the camera is not invariant to the intensity of the incident light and age of the sign as they fade with time.

As demonstrated above by the explanation of existing systems, many of the solutions to detecting and recognizing objects of interest in a captured image are not optimal. Therefore, a system for detecting and recognizing objects of interest in a captured image that is capable of operating in various environments is needed.

SUMMARY

According to a disclosed embodiment, an object detection and recognition system is provided. The system includes at least one image capture device. A vision controller is configured to receive images from the image capture device. An object detector is configured to recognize an object of interest within the received images. A vehicle controller receives the object of interest and is configured to control a vehicle subsystem in response to the object of interest.

In an alternative embodiment, the system includes an object segmenter configured to isolate individual objects within the received images, and an object recognizer configured to determine whether the individual objects include an object of interest.

In an alternative embodiment, an object detection and recognition method is provided. The method includes the steps of receiving captured images from at least one image capture device, recognizing an object of interest within the received images, and providing object recognition information to a vehicle controller controlling a vehicle subsystem in response to the object of interest.

According to another disclosed embodiment, the object segmenter receives images from at least two image capture devices to form a stereoscopic representation of the received images to obtain range information for the received images and isolates individual objects within the received images using the range information.

According to another disclosed embodiment, the recognizing step further includes the steps of mapping the image pixel addresses of the isolated object into the pixel addresses of at least one object of interest image, least squares curve fitting of the mapping parameters, correlation of the mapped and object of interest image, and object recognition by selecting the at least one object of interest image having the greatest correlation.

It is to be understood that both the foregoing general description and the following detailed description are exemplary and explanatory only, and are not restrictive of the invention as claimed. These and other features, aspects and advantages of the present invention will become apparent from the following description, appended claims, and the accompanying exemplary embodiments shown in the drawings, which are briefly described below.

DETAILED DESCRIPTION

Embodiments of the present invention will be described below with reference to the accompanying drawings. It should be understood that the following description is intended to describe exemplary embodiments of the invention, and not to limit the invention.

Figure 1:
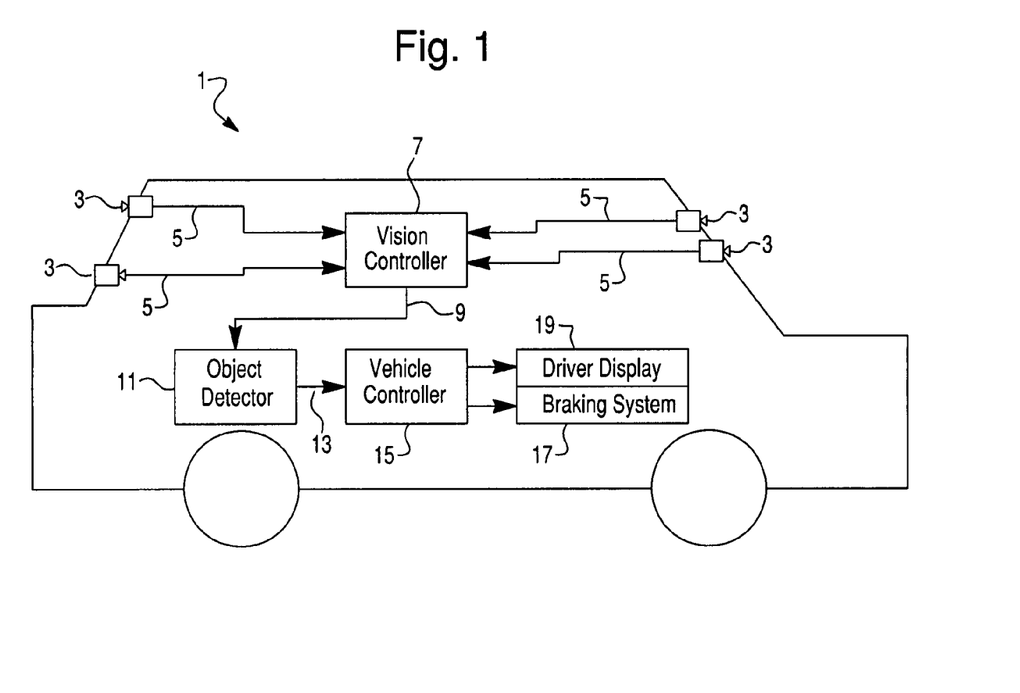
FIG. 1 illustrates a vehicle having an object detection and recognition system, according to one embodiment.

OVERVIEW: The object detection and recognition system 1 is illustrated in FIG. 1 according to one embodiment. At least one image capture device 3 is positioned on the vehicle in order to capture images of the scene of interest. This scene includes the exterior and the interior of the vehicle. The image capture devices 3 are operably connected to a vision controller 7 and provide the images 5 to it in a typically serial format. The vision controller 7 buffers and provides the image data 9 to the object detector 11 in a compatible format 9. The object detector 11 recognizes an object of interest within the image 9 and provides this information 13 to the vehicle controller 15. The vehicle controller 15 responds to the recognition of an object of interest by adjusting vehicle control subsystems including the brake system 17 and driver display system 19.

Figure 2:
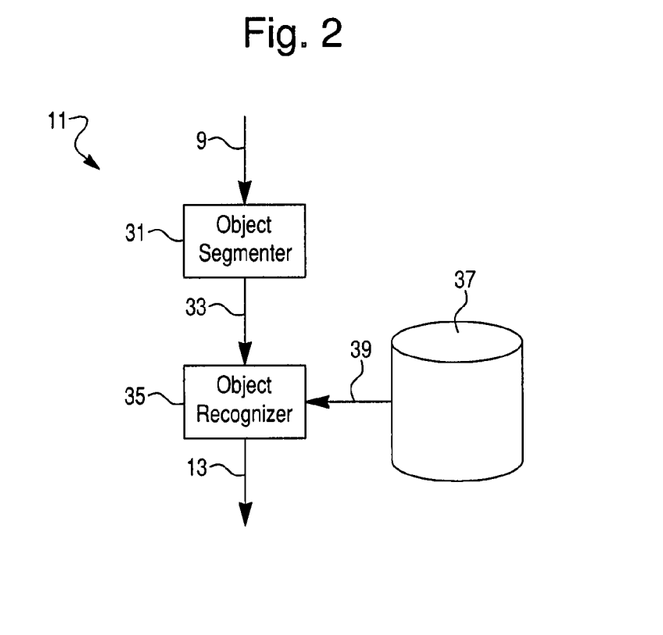
FIG. 2 illustrates an object detection and recognition system, according to one embodiment.

A block diagram of the object detector 11 is illustrated in FIG. 2. The image data 9 is passed to the object segmenter 31 to isolate individual objects within the image 9. The segmented portion 33 of the image is passed to the object recognizer 35 to determine if the image 33 includes an object of interest. The database 37 provides object of interest information 39 to the object recognizer. The object recognizer passes recognized objects of interest 13 to the vehicle controller 15.

Figure 3:
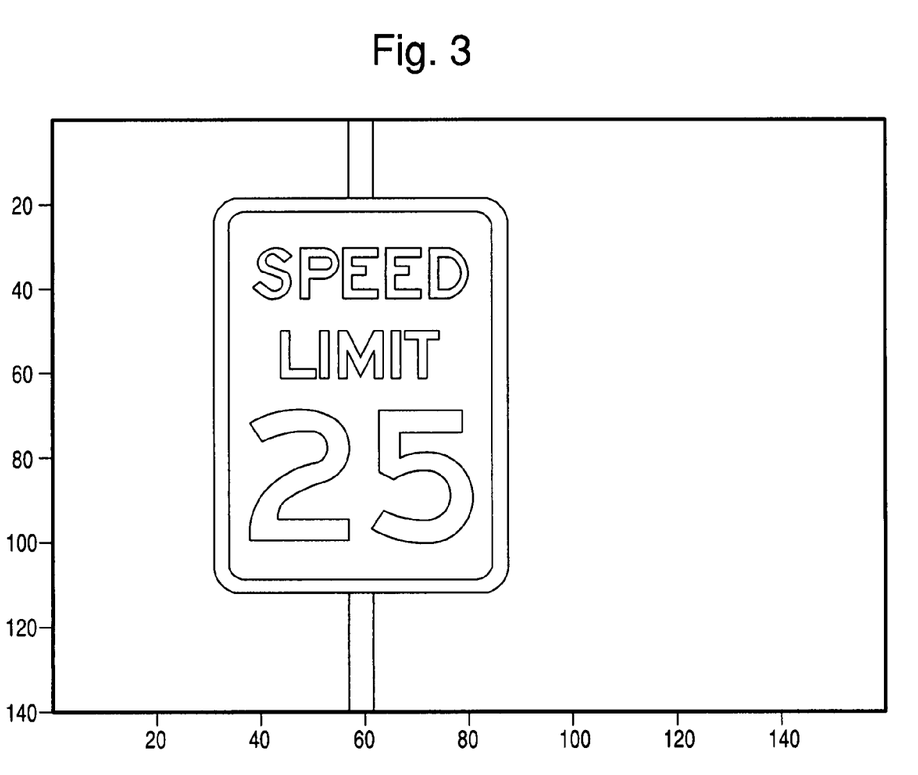
FIG. 3 illustrates a segmented sign image.

OBJECT SEGMENTATION: The object segmenter 31 uses image processing algorithms to isolate distinct objects within the image data 9. In one embodiment, using image data from a single image capture device 3, the clustering of pixels into an object uses edge detection and region growing algorithms. In another embodiment, pixel color information is also used. FIG. 3 illustrates a resulting segmented sign image.

In a further embodiment, the segmenter 31 uses images 9 from at least two image capture devices 3 to form a stereoscopic representation of the imaged scene. The three dimensional stereoscopic image includes the range to as well as the vertical and lateral displacement of each pixel. Having the range information substantially enhances the segmentation process as it has a third clustering dimension to work with. Clustering in three dimensions produces the depth of the object as well as its vertical height and lateral width. These are measured in distance units (e.g. meters).

Figure 4:
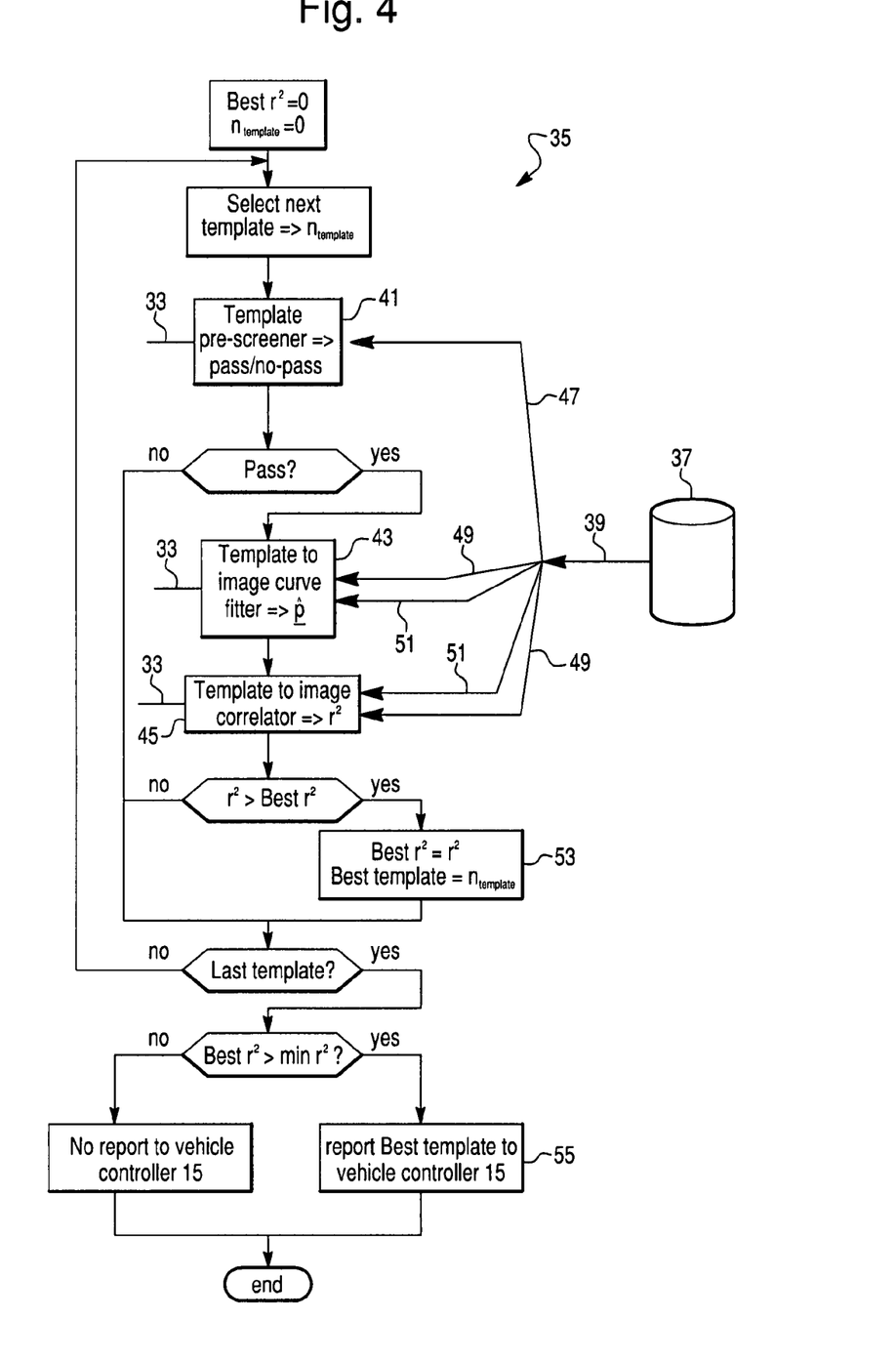
FIG. 4 illustrates an object recognition system, according to one embodiment.

OBJECT RECOGNITION: A block diagram of the object recognizer 35 is illustrated in FIG. 4. Each object of interest, represented by a template 39 within the database 37, is selected and tested against the segmented image 33. For each template 39 from the database 37, the object recognizer 35:

pre-screens 41 the template 39 to qualify it;
curve fits 43 pre-screened templates to the image 33;
calculates 45 the correlation between the curve fitted template and image 33;
selects 53 the template with the maximum correlation; and
if the maximum correlation exceeds a minimum value, reports 55 the maximum correlation template to the vehicle controller 15.

Figure 5:
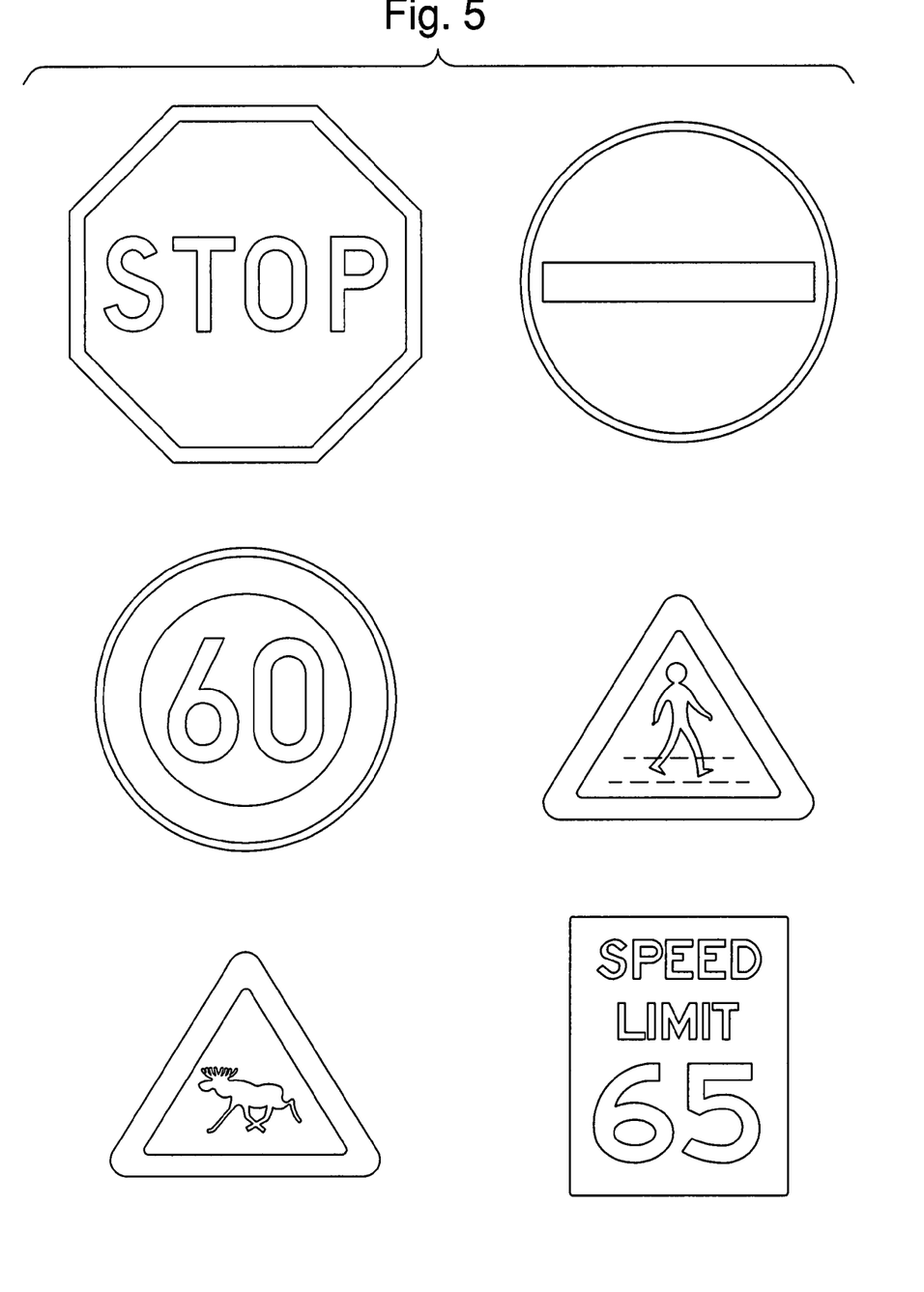
FIG. 5 illustrates signs that are used for template generation.
Figure 6:
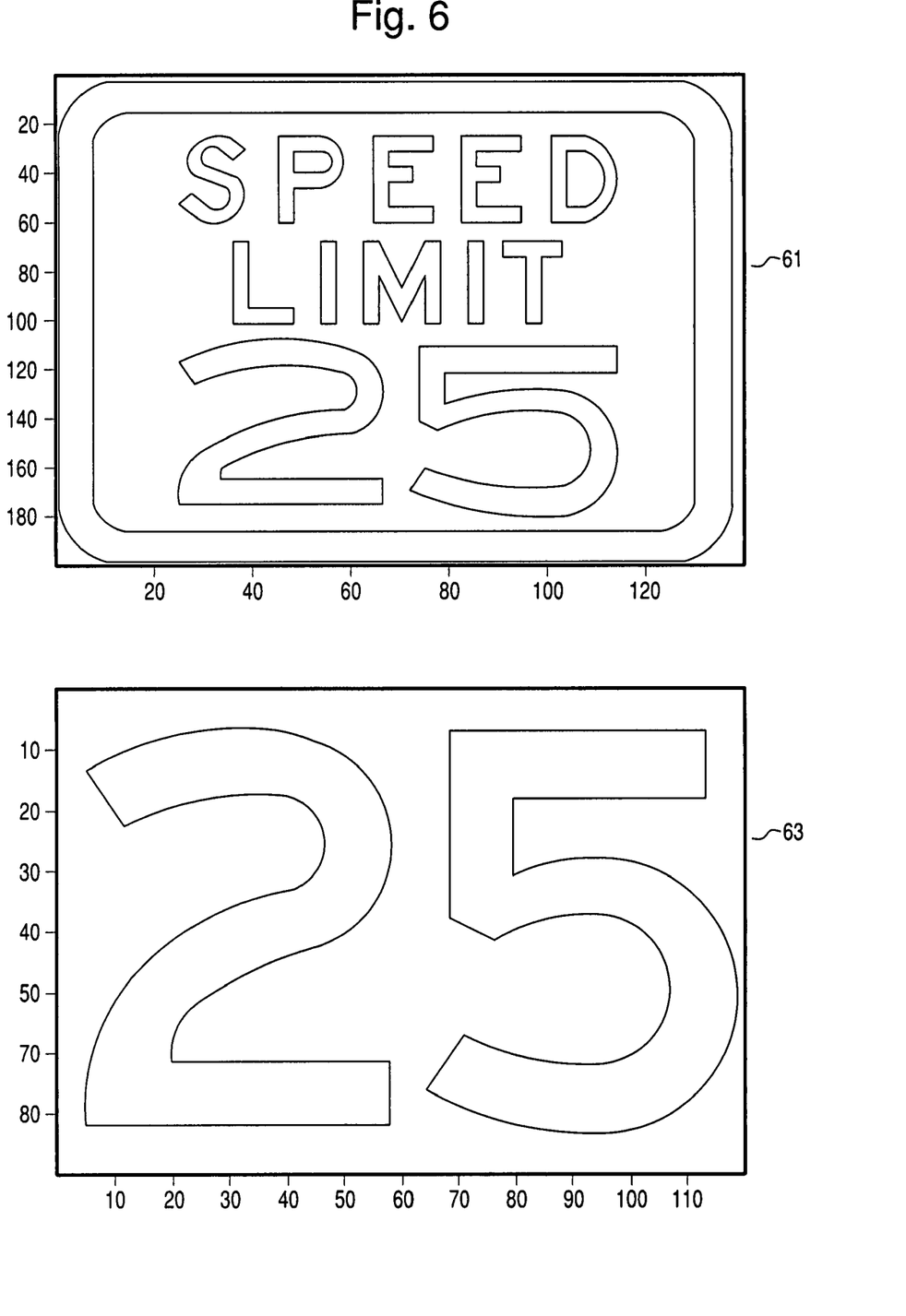
FIG. 6 illustrates a pixelized template and a template formed from a portion of the full image.

TEMPLATES: A template 39 of an object of interest includes an image 49 of the object of interest. An image of an object of interest is formed by any graphical symbology and is not limited by language nor content. The image is represented by an equation or table mapping illumination to x-y coordinates, a pixelized image, or other means. Examples of the color and black/white graphical symbology that can be converted into template images are shown in FIG. 5. FIG. 6 illustrates a pixilated sign template 61. In one embodiment, to reduce the image storage, a pertinent portion 63 of the sign is used as a template rather than the entire image.

PRE-SCREENING A TEMPLATE: Pertinent templates for the segmented object 33 are those that fit within a set of pre-screening qualifications 47. These qualifications include agreement between the object location within the image 9, the object geometric proportions, color, and other qualifiers. These qualifications are included in the database 37 for each template 39 and are provided 47 to the pre-screener. Other sensing systems may assist the pre-screening process. For example, if a vehicle is on a multi-lane highway, a system that can determine which lane the vehicle is in can be used to establish the minimum cross-distance that an object can appear.

Given the variation in signs from locale to locale, in one embodiment templates are pre-stored in the ubiquitous GPS navigation system and provided to update the database as the location of the vehicle changes. In another embodiment the GPS position data is used directly to enable and disable templates pre-stored in the database 37. In a further embodiment, the GPS position is used to pre-screen 41 a template.

A stereoscopic image of the object provides its depth as well and height and width, and depth is used to pre-screen templates (e.g. signs have no significant depth and sign templates are eliminated should the object have significant depth).

COMPARISON OF THE SEGMENTED OBJECT TO A PRE-SCREENED TEMPLATE: However an object is segmented for processing by the object recognizer 35, the object recognizer examines the segmented image 33 from one image capture device and compares that image to pre-screened templates of objects of interest stored in the database 37.

Figure 7:
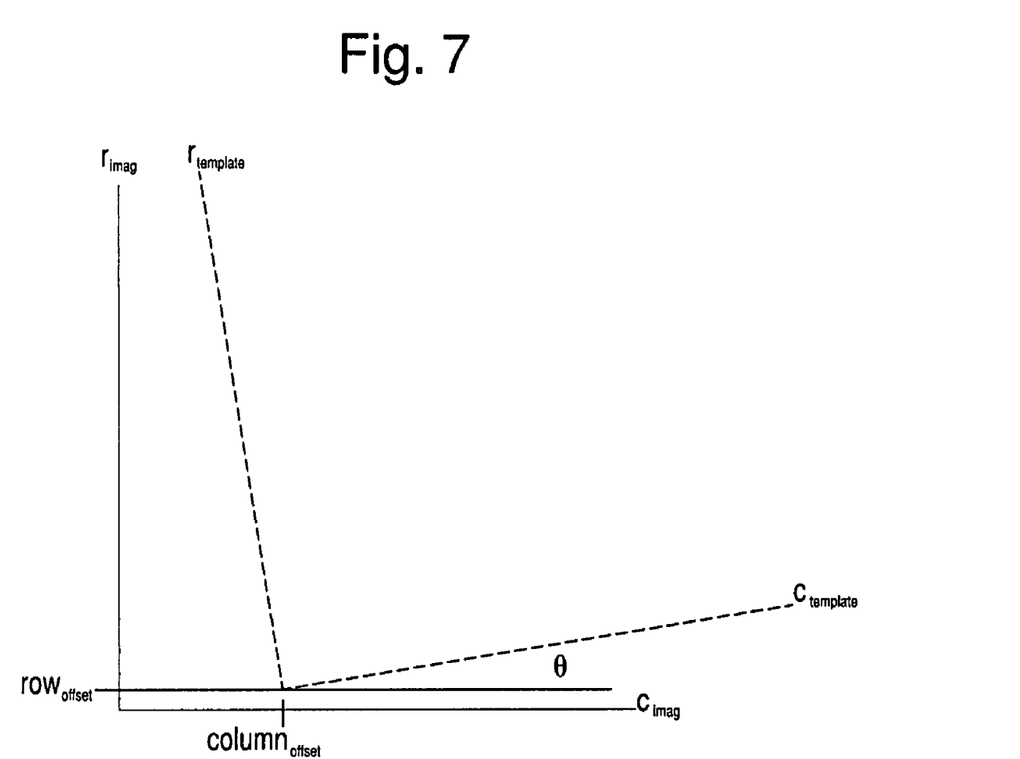
FIG. 7 illustrates the coordinate mapping between a segmented image and a rotated template image.

The segmented images 33 may be scaled with distance from the vehicle, rotated with respect to the vehicle, or have color and illumination that vary with local conditions. The basis of the comparison is to map pixels from the database template 49 to segmented image pixels 33. For example, ignoring rotation of the two images relative to each other, mapping $\text{pixel}_{template}(\text{row}_{template}, \text{column}_{template})$ into $\text{pixel}_{image}(\text{row}_{image}, \text{column}_{image})$ is performed as $$\text{row}_{image} = s_{scale}\text{row}_{template} + \text{row}_{offset},$$

$$\text{column}_{image} = s_{scale}\text{column}_{template} + \text{column}_{offset}$$

where (row, column) is the pixel address of the pixel within the template or segmented image. The unknown constant $s_{scale}$ compensates for image size, and $\text{row}_{offset}$ and $\text{column}_{offset}$ are unknown constants that compensate for centering within the image. As shown in FIG. 7, if image rotation is an issue, the mapping includes a rotation angle coupled with an affine transformation such as $$\text{row}_{image} = s_{scale}(\text{row}_{template} \cos\theta + \text{column}_{template} \sin\theta) + \text{row}_{offset}$$

$$\text{column}_{image} = s_{scale}(-\text{row}_{template} \sin\theta + \text{column}_{template} \cos\theta) + \text{column}_{offset}$$

where $\theta$ is an unknown constant rotation angle.

The common $s_{scale}$ for rows and columns assumes the template pixels and segmented image pixels have identical aspect ratios. If the aspect ratios are not the same, then $$\text{row}_{image} = s_{scale}(\alpha_{row}\text{row}_{template} \cos\theta + \alpha_{column}\text{column}_{template} \sin\theta) + \text{row}_{offset}$$

$$\text{column}_{image} = s_{scale}(\alpha_{row}\text{row}_{template} \sin\theta + \alpha_{column}\text{column}_{template} \cos\theta) + \text{column}_{offset}$$

where $\alpha_{row}$ and $\alpha_{column}$ are the size ratios of the image capture device 3 to template rows and columns.

In an alternate embodiment the pixels from the segmented image 33 are mapped to the pixels of the template image 49 as $$row_{template} = [(row_{image} - row_{offset})\cos\theta - (column_{image} - column_{offset})\sin\theta]/s_{scale}$$

$$column_{template} = [(row_{image} - row_{offset})\sin\theta + (column_{image} - column_{offset})\cos\theta]/s_{scale}$$

Since generally there are more pixels in the segmented image than in the template image, this embodiment may not be as efficient as mapping pixels from the template to the segmented image.

The unknown constants ($s_{scale}$, $row_{offset}$, $column_{offset}$, $\theta$) are determined by minimizing the square error between the template and the mapped image. For example, if color is not involved, but only illumination, the square error to minimize is $$J(\lambda_{illum}, s_{scale}, row_{offset}, column_{offset}, \theta) = \sum_{r=0}^{R_{template}-1} \sum_{c=0}^{C_{template}-1}$$

$$\{\lambda_{illum} I_{image}[s_{scale}(r\cos\theta + c\sin\theta) + row_{offset}, s_{scale}(-r\sin\theta + c\cos\theta) + column_{offset}] - I_{template}[r, c]\}^2$$

where $\lambda_{illum}$ is an unknown constant that scales illumination, and I[r, c] is the illumination of pixel[r, c]. The terms $R_{template}$ and $C_{template}$ are the number of rows and columns in the template image. This can be written in vector format as $$J(\underline{p}) = \sum_{r=0}^{R_{template}-1} \sum_{c=0}^{C_{template}-1} \varepsilon(\underline{p}, r, c)^2$$

$$\underline{p} = [\lambda_{illum}\ s_{scale}\ row_{offset}\ column_{offset}\ \theta]^T$$

$$\varepsilon(\underline{p}, r, c) = \lambda_{illum} I_{image}[s_{scale}(r\cos\theta + c\sin\theta) + row_{offset}, s_{scale}(-r\sin\theta + c\cos\theta) + column_{offset}] - I_{template}[r, c]$$

If color is considered, the illumination is made up of the color components. For example, in the RGB color reference frame $$J(\underline{p}) = \sum_{r=0}^{R_{template}-1} \sum_{c=0}^{C_{template}-1} \underline{\varepsilon}(\underline{p}, r, c)^T \underline{W}\underline{\varepsilon}(\underline{p}, r, c)$$

$$\underline{p} = [\lambda_R\ \lambda_G\ \lambda_B\ s_{scale}\ row_{offset}\ column_{offset}\ \theta]^T$$

$$\underline{\varepsilon}(\underline{p}, r, c) = \begin{bmatrix} \lambda_R R_{image}\begin{bmatrix} s_{scale}(r\cos\theta + c\sin\theta) + row_{offset}, s_{scale} \\ (-r\sin\theta + c\cos\theta) + column_{offset} \end{bmatrix} - R_{template}[r, c] \\ \lambda_G G_{image}\begin{bmatrix} s_{scale}(r\cos\theta + c\sin\theta) + row_{offset}, s_{scale} \\ (-r\sin\theta + c\cos\theta) + column_{offset} \end{bmatrix} - G_{template}[r, c] \\ \lambda_B B_{image}\begin{bmatrix} s_{scale}(r\cos\theta + c\sin\theta) + row_{offset}, s_{scale} \\ (-r\sin\theta + c\cos\theta) + column_{offset} \end{bmatrix} - B_{template}[r, c] \end{bmatrix}$$

where each of the R, G, and B components has an associated intensity and W is a 3×3 weighting matrix assigning the relevance of the various elements of $\underline{\varepsilon}$. For equal weighting, W is the identity matrix. The variation of color components in the segmented image as compared to the template is mitigated by considering the closest match between the components and does not require an absolute agreement.

There are many standard approaches to select the unknown constant vector p to minimize the square error function. Gradient and quasilinearization are two such methods. The gradient method begins with initial estimates of p and selects better estimates in the direction of the gradient of J(p):

$$p_{i+1} = p_i - k\nabla_p J(p_i)$$

where $\nabla_p J(p_i)$ is the gradient of J(p) evaluated at $p_i$ and k controls the step size. The gradient is determined by numerical perturbation $$\nabla_v J(\underline{p}_i) \approx \frac{J(p_{1,i}, \ldots, v + \Delta v, \ldots) - J(\underline{p}_i)}{\Delta v}$$

Quasilinearization begins by writing the anticipated value of J(p) as $$J(\underline{p}_i + \underline{\Delta p}) = \sum_{r=0}^{R_{template}-1} \sum_{c=0}^{C_{template}-1} \underline{\varepsilon}(\underline{p}_i + \underline{\Delta p}, r, c)^T \underline{W}\underline{\varepsilon}(\underline{p}_i + \underline{\Delta p}, r, c)$$

where

-continued $$J(\underline{p}_i + \underline{\Delta p}) = \sum_{r=0}^{R_{template}-1} \sum_{c=0}^{C_{template}-1} \underline{\varepsilon}(\underline{p}_i + \underline{\Delta p}, r, c)^T \underline{W} \underline{\varepsilon}(\underline{p}_i + \underline{\Delta p}, r, c)$$

Expanding in a Taylor series keeping only up to the 1$^{st}$ derivative $$J(\underline{p}_i + \underline{\Delta p}) = \sum_{r=0}^{R_{template}-1} \sum_{c=0}^{C_{template}-1} \underline{\varepsilon}(\underline{p}_i + \underline{\Delta p}, r, c)^T \underline{W} \underline{\varepsilon}(\underline{p}_i + \underline{\Delta p}, r, c)$$

$$\approx \sum_{r=0}^{R_{template}-1} \sum_{c=0}^{C_{template}-1} [\underline{\varepsilon}(\underline{p}_i, r, c) + \nabla_{\underline{p}} \underline{\varepsilon}(\underline{p}_i, r, c) \underline{\Delta p}]^T$$

$$\underline{W}[\underline{\varepsilon}(\underline{p}_i, r, c) + \nabla_{\underline{p}} \underline{\varepsilon}(\underline{p}_i, r, c) \underline{\Delta p}]$$

The error vector gradient is estimated as $$\nabla_{\underline{p}} \underline{\varepsilon}(\underline{p}_i, r, c) = [\nabla_{\lambda_R} \underline{\varepsilon}(\underline{p}_i, r, c) \ldots \nabla_{\theta} \underline{\varepsilon}(\underline{p}_i, r, c)]$$

$$\nabla_{v} \underline{\varepsilon}(\underline{p}_i, r, c) \approx \frac{\underline{\varepsilon}(\lambda_{R,i}, \ldots, v_i + \Delta v, \ldots, \theta_i, r, c) - \underline{\varepsilon}(\underline{p}_i, r, c)}{\Delta v}$$

The J is minimized when its gradient is zero:

$$\nabla_{\underline{\Delta p}} J(\underline{p}_i + \underline{\Delta p}) \approx -2 \sum_{r=0}^{R_{template}-1} \sum_{c=0}^{C_{template}-1} [\underline{\varepsilon}(\underline{p}_i, r, c) + \nabla_{\underline{p}} \underline{\varepsilon}(\underline{p}_i, r, c) \underline{\Delta p}]^T \underline{W}[\nabla_{\underline{p}} \underline{\varepsilon}(\underline{p}_i, r, c)] = \underline{0}$$

forming the iterative equation $$\underline{\Delta p} = -\left\{\sum_{r=0}^{R_{template}-1} \sum_{c=0}^{C_{template}-1} [\nabla_{\underline{p}} \underline{\varepsilon}(\underline{p}_i, r, c)]^T \underline{W} \nabla_{p} \underline{\varepsilon}(\underline{p}_i, r, c)\right\}^{-1}$$

$$\sum_{r=0}^{R_{template}-1} \sum_{c=0}^{C_{template}-1} \{[\nabla_{\underline{p}} \underline{\varepsilon}(\underline{p}_i, r, c)]^T \underline{W} \underline{\varepsilon}(\underline{p}_i, r, c)\}$$

$$\underline{p}_{i+1} = \underline{p}_i + \underline{\Delta p}$$

The key to efficiently minimize the J functional is to start with a good estimate of p. For example:
  intensity factor λ for each color considered are initialized as the ratio between the average intensity of the color in the segmented image to the average intensity of the color in the template image;
  size scale factor $s_{scale}$ is initialized as the square root of the ratio of the pixel area of the segmented image to that of the template image;
  offsets are initialized to the origin of the segmented image; and
  rotation angle is initialized to zero.
For this purpose, certain statistical measures of the template image, used as initialization parameters 51, are included with the template database information 39 such as:
  average intensity of each color in the template image;
  pixel area of the template image
Having curve fit the best fit parameter vector $\hat{p}$, the correlation between the resulting best fit to the template is determined in order to compare this template curve fit to those of other templates in the database. For each color considered, the correlation between the segmented image and the template is $$r_P^2 = \frac{\sum_{r=0}^{R_{template}-1} \sum_{c=0}^{C_{template}-1} [\Pi_{image}(\hat{p}, c, r) - \overline{\Pi}_{image}(\hat{p})][P_{template}(c, r) - \overline{P}_{template}]}{\sqrt{\sum_{r=0}^{R_{template}-1} \sum_{c=0}^{C_{template}-1} [\Pi_{image}(\hat{p}, c, r) - \overline{\Pi}_{image}(\hat{p})]^2 \sum_{r=0}^{R_{template}-1} \sum_{c=0}^{C_{template}-1} [P_{template}(c, r) - \overline{P}_{template}]^2}}$$

$$\Pi_{image}(\hat{p}, c, r) = \hat{\lambda}_P P_{image}[\hat{s}_{scale}(r\cos\hat{\theta} + c\sin\hat{\theta}) + r\hat{o}w_{offset}, \hat{s}_{scale}(-r\sin\hat{\theta} + c\cos\hat{\theta}) + co\hat{l}umn_{offset}]$$

where P is R or G or B depending on the color being considered, and $\overline{\Gamma}$ is the average value of $\Gamma$. The average values of the template $\overline{P}_{template}$ and the sum $$\sum_{r=0}^{R_{template}-1} \sum_{c=0}^{C_{template}-1} [P_{template}(c, r) - \overline{P}_{template}]^2$$

are included 51 in the database information 39. When color is considered, the combined correlation among all the colors in the image is $$r^2 = [r_R^2 \ r_G^2 \ r_B^2]^T \underline{W} \begin{bmatrix} r_R^2 \\ r_G^2 \\ r_B^2 \end{bmatrix}$$

The segmented image is compared to all pre-screened 41 templates in the database and the comparison with the greatest $r^2$ correlation is chosen as the closest template match. If the $r^2$ correlation exceeds a minimal threshold, the object recognition is accepted.

Table 1 illustrates the object recognition process. The segmented image of a black/white 25 mph speed sign is compared to template images of a 25 mph sign, a 35 mph sign, and a 45 mph sign. As can be seen, with each curve fitting interation the functional J is reduced causing the $r^2$ correlation to increase. The recognition of a 25 mph sign is resolved by its correlation being greater than for the 35 mph and 45 mph templates.

TABLE 1 recognition example

| J | $r^2$ | $s_{scale}$ | $\lambda_{illum}$ | column$_{offset}$ | row$_{offset}$ | Iteration |
|---|---|---|---|---|---|---|
| 25 mph-segmented sign vs. 25 mph template | | | | | | |
| 14721 | 0.792 | 0.674 | 1.002 | 0.023 | 0.312 | initialization |
| 12314 | 0.832 | 0.673 | 1.000 | −1.168 | 0.926 | 1 |
| 25 mph-segmented sign vs. 35 mph template | | | | | | |
| 59875 | 0.634 | 0.639 | 1.391 | 0.255 | 0.100 | initialization |
| 56235 | 0.656 | 0.644 | 1.457 | −0.989 | 0.080 | 2 |
| 51472 | 0.689 | 0.637 | 1.419 | −0.414 | 1.093 | 4 |
| 48877 | 0.703 | 0.620 | 1.460 | −0.145 | 1.804 | 7 |
| 45741 | 0.725 | 0.611 | 1.454 | 0.282 | 1.636 | 8 |

TABLE 1-continued recognition example

| J | $r^2$ | $s_{scale}$ | $\lambda_{illum}$ | column$_{offset}$ | row$_{offset}$ | Iteration |
|---|---|---|---|---|---|---|
| 41850 | 0.750 | 0.575 | 1.518 | 1.181 | 3.449 | 12 |
| 25 mph-segmented sign vs. 45 mph template | | | | | | |
| 226223 | 0.412 | 0.808 | 2.113 | 0.373 | −0.130 | initialization |
| 206954 | 0.482 | 0.782 | 2.109 | 0.153 | −0.777 | 2 |
| 196263 | 0.518 | 0.790 | 2.065 | −0.211 | 0.206 | 4 |
| 195482 | 0.378 | 0.797 | 2.062 | −0.696 | −0.494 | 5 |

Experience with this procedure has emphasized the value of using the blurred pixelized acquired images versus using 'cleaned up' versions with, for example, edge detection. The pixel blurring provides gradient information that aids the convergence of the curve fitting process.

RESPONSE TO RECOGNITION: Having recognized an object of interest by finding a pre-screened template with sufficient correlation to the segmented image, the identity of that object of interest is reported 13 to the vehicle controller 15. The vehicle controller acts on the information by alerting 19 the driver or altering the operation of the vehicle subsystems 17. For example, detection a speed sign indicating a speed limit, while the vehicle controller 15 speed sensor indicates the vehicle is exceeding this limit, causes an excessive speed warning being display to the driver; an extreme excess causes the vehicle controller to apply the brakes.

Although the embodiments described herein have focused on road signs for illustrative purposes, the same approach is adapted for recognizing other objects within and without the vehicle.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention.

What is claimed is:

1. An object detection and recognition system for a vehicle, comprising:
    at least one image capture device;
    a vision controller configured to receive images from the image capture device;
    an object detector configured to recognize an object of interest within the received images; and
    a vehicle controller for receiving the object of interest and configured to control a vehicle subsystem in response to recognition of the object of interest,
    wherein the object detector comprises an object segmenter configured to isolate individual objects within the received images and an object recognizer configured to determine whether the individual objects include the object of interest by curve fitting at least one object of interest template to one of the isolated individual objects.

2. An object detection and recognition system for a vehicle, as claimed in claim 1, wherein the vehicle subsystem is a braking system.

3. An object detection and recognition system for a vehicle, as claimed in claim 1, wherein the vehicle subsystem is a driver display.

4. An object detection and recognition system for a vehicle, as claimed in claim 1, wherein the object detector further comprises a database configured to store the at least one object of interest template.

5. An object detection and recognition system, as claimed in claim 4, wherein the object recognizer is configured to receive the at least one object of interest template from the database, and is configured to curve fit the at least one object of interest template to the one of the isolated individual objects by mapping the at least one object of interest template onto the one of the isolated individual objects by determining values of mapping parameters that minimize a function of deviations between the mapped template and the one of the isolated individual objects.

6. An object detection and recognition system, as claimed in claim 5, wherein the mapping parameters include a geometrical scale factor and an offset.

7. An object detection and recognition system, as claimed in claim 6, wherein the mapping parameters further include an illumination scale factor for each color component forming the one of the isolated individual objects.

8. An object detection and recognition system, as claimed in claim 5, wherein the at least one object of interest template received by the object recognizer is a plurality of object of interest templates from the database,
    wherein the object recognizer is configured to:
        pre-screen the object of interest templates to obtain pre-screen templates;
        curve fit the pre-screened templates to the individual objects to obtain curve fitted templates;
        calculate correlation between the curve fitted templates and the individual objects;
        select an object of interest template with a maximum correlation; and
        report the selected object of interest template to the vehicle controller if the maximum correlation exceeds a minimum value.

9. An object detection and recognition system, as claimed in claim 5, wherein GPS position data is used to enable or disable the at least one object of interest template received from the database.

10. An object detection and recognition system, as claimed in claim 1, wherein the object segmenter is configured to receive images from the at least one image capture device and isolate the individual objects within the received images.

11. An object detection and recognition system, as claimed in claim 10, wherein the object segmenter is configured to use color information to isolate the individual objects within the received images.

12. An object detection and recognition system, as claimed in claim 1, wherein the object segmenter is configured to receive images from at least two image capture devices to form a stereoscopic representation of the received images to obtain range information for the received images and configured to isolate the individual objects within the received images using said range information.

13. An object detection and recognition system, as claimed in claim 12, wherein the object segmenter further uses color information in combination with the range information to isolate the individual objects within the received images.

14. A method for object detection and recognition in a vehicle, comprising the steps of:
    receiving captured images from at least one image capture device;
    isolating individual objects within the received images;
    determining whether the individual objects include an object of interest by curve fitting object of interest templates to the individual objects; and
    controlling a vehicle subsystem in response to the object of interest.

15. A method for object detection and recognition in a vehicle, as claimed in claim 14, wherein the vehicle subsystem is a braking system.

16. A method for object detection and recognition in a vehicle, as claimed in claim 14, wherein the vehicle subsystem is a driver display.

17. A method for object detection and recognition in a vehicle, as claimed in claim 14, wherein the object of interest templates are stored in a database.

18. A method for object detection and recognition, as claimed in claim 17, wherein the curve fitting comprises mapping the object of interest templates onto the individual objects by determining values of mapping parameters that minimize a function of the deviations between the mapped templates and the individual objects.

19. A method for object detection and recognition, as claimed in claim 18, wherein the mapping parameters include a geometrical scale factor and an offset.

20. A method for object detection and recognition system, as claimed in claim 19, wherein the mapping parameters for each mapped template further include an illumination scale factor for, at each color component, forming its respective isolated individual object.

21. A method for object detection and recognition in a vehicle, as claimed in claim 17, wherein the determining step further comprises:
    receiving the object of interest templates from the database;
    pre-screening the object of interest templates to obtain pre-screen templates;
    curve fitting the pre-screened templates to the individual objects to obtain curve fitted templates;
    calculating correlation between the curve fitted templates and the individual objects;
    selecting an object of interest template with a maximum correlation; and
    reporting the selected object of interest template to the vehicle controller if the maximum correlation exceeds a minimum value.

22. A method for object detection and recognition in a vehicle, as claimed in claim 21, wherein GPS position data is used to enable or disable the object of interest templates received from the database.

23. A method for object detection and recognition in a vehicle, as claimed in claim 14, wherein the isolating step uses color information to isolate the individual objects within the received captured images.

24. A method for object detection and recognition in a vehicle, as claimed in claim 14, wherein the isolating step receives images from at least two image capture devices to form a stereoscopic representation of the received captured images to obtain range information for the received captured images and isolates the individual objects within the received captured images using said range information.

25. A method for object detection and recognition in a vehicle, as claimed in claim 24, wherein the isolating step uses color information in combination with the range information to isolate the individual objects within the received images.

* * * * *